United States Patent
Yamauchi et al.

(10) Patent No.: US 6,298,183 B1
(45) Date of Patent: Oct. 2, 2001

(54) OPTICAL FIBER GRATING AND MANUFACTURING METHOD THEREFOR

(75) Inventors: Ryozo Yamauchi; Akira Wada; Tetsuya Sakai; Nobuyuki Tanaka; Kensuke Shima; Kenji Nishide; Shigefumi Yamasaki, all of Sakura (JP)

(73) Assignee: Fujikura Ltd. (JP)

( * ) Notice: Subject to any disclaimer, the term of this patent is extended or adjusted under 35 U.S.C. 154(b) by 0 days.

(21) Appl. No.: 09/088,630

(22) Filed: Jun. 2, 1998

(30) Foreign Application Priority Data

Sep. 11, 1997 (JP) .................................................. 9-247292

(51) Int. Cl.[7] .................................................. G02B 6/34
(52) U.S. Cl. .................................................. 385/37; 385/39
(58) Field of Search ........................ 385/37, 39; 65/402, 65/403, 406, 410, 412, 415, 438, 444

(56) References Cited

U.S. PATENT DOCUMENTS

| | | | |
|---|---|---|---|
| 5,411,566 | 5/1995 | Poole et al. | 65/402 |
| 5,430,817 | 7/1995 | Vengsarkar | 385/37 |
| 5,446,820 | * 8/1995 | Ishikawa et al. | 385/123 |
| 5,625,472 | * 4/1997 | Mizrahi et al. | 359/34 |

FOREIGN PATENT DOCUMENTS

| | | |
|---|---|---|
| 0 572 169 | 12/1993 | (EP) . |
| 0 736 784 | 10/1996 | (EP) . |
| 7-283786 | 10/1995 | (JP) . |

OTHER PUBLICATIONS

Kenneth O. Hill et al, "Fiber Bragg Grating Technology Fundamentals and Overview", Journal of Lightwave Technology, vol. 15, No. 8, Aug. 1997.

"A novel long–period fiber grating using periodically released residual stress of pure–silica core fiber", Technical Digest, vol. 2, Feb. 22–27, 1998, pp. 276–277.

"Band–rejection fiber using periodic cored deformation" Optical Fiber Communication, vol. 2, Feb. 25, 1996–Mar. 1, 1996, pp. 267–269.

"Long–Period Fiber gratings Shape Optical Spectra", Laser Focus World, vol. 32, No. 6, Jun., 1996, pp. 243–246.

* cited by examiner

Primary Examiner—Mohammad Y. Sikder
(74) Attorney, Agent, or Firm—Chadbourne & Parke LLP

(57) ABSTRACT

An optical fiber grating is manufactured by heating intermittently an optical fiber, provided with a core having residual stress in the longitudinal direction, softening a peripheral cladding of the core, and forming spatial periodical changes for the relative refractive index-difference between the core and the cladding, in the longitudinal direction of the aforementioned optical fiber by having the index of refraction of the core change, through the releasing of the aforementioned residual stress. As a result, an optical fiber grating and the manufacturing method thereof, which do not require expensive equipment and which exhibit high productivity, and furthermore a grating characteristic which is stable over time can be provided.

8 Claims, 9 Drawing Sheets

FIG.6
(a)
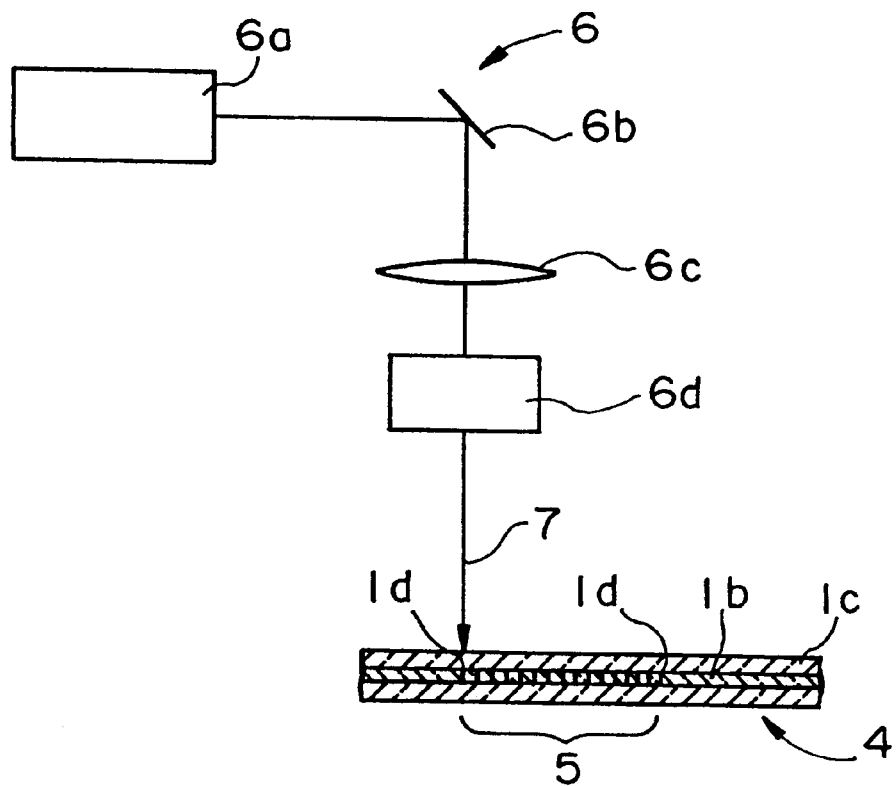
(b)
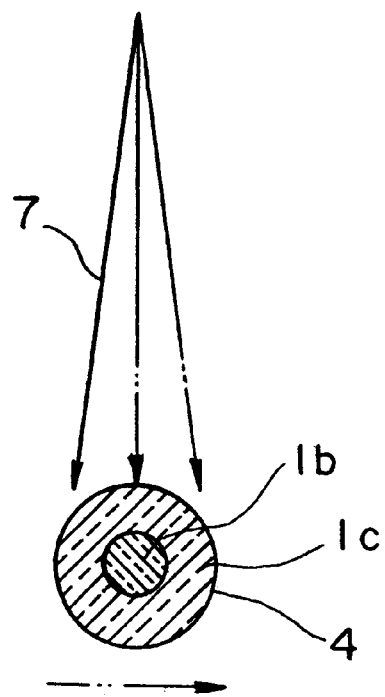

OPTICAL FIBER GRATING AND MANUFACTURING METHOD THEREFOR

BACKGROUND OF THE INVENTION

1. Field of the Invention

The present invention relates to an optical fiber grating and to a manufacturing method therefor. More particularly, it relates to an optical fiber grating which is low cost and exhibits small changes over time, and to a manufacturing method therefor. The present specification is based on Japanese Patent Application No. Hei 9-247292, filed in Japan, the contents of which are incorporated herein by reference.

2. Description of the Related Art

An optical waveguide grating has a spatially periodic perturbation of waveguide structure, formed in a longitudinal direction of an optical fiber or of a Planar Lightwave Circuit (PLC).

This optical wageguide grating is a device which is capable of making loss of light in a specified wavelength band, by generating couplings between the mutual specified modes. Then, having such a characteristic, it may be utilized as coupling-type devices for the elimination of light for specified wavelength band and as coupling-type devices between specified modes.

The optical waveguide grating may be classified into a reflecting type and a radiating type, according to the relationship between the coupling modes.

Here, let the direction of incidence of light for the optical waveguide be the positive direction, and a direction opposite to it, the negative direction.

A reflecting-type optical waveguide grating has been imparted with a characteristic for reflecting light of specified wavelength, by coupling a mode which propagates through the core in the positive direction and a mode which propagates through the core in the negative direction.

A radiating-type optical waveguide grating has been imparted with a characteristic for radiating by coupling a mode which propagates through the core and a mode which propagates through the cladding, so as to obtain the characteristic by having the light of specified wavelength which is radiated to the outside of the waveguide and then attenuated.

Now, the periodic perturbation In the waveguide structure for an optical waveguide grating may be formed by changing the index of refraction for the core or the core diameter.

The most general method of manufacturing an optical waveguide grating is one in which the index of refraction of the core is made to change by a phtotorefractive effect (sometimes also called the "photosensitive effect").

The photorefractive effect is a phenomenon whereby, for example, when silica glass with germanium as the dopant is irradiated with ultraviolet rays in the neighborhood of wavelength 240 nm, an increase in the index of refraction is observed for the silica glass.

Specific description of the optical fiber will be given concretely as an example as follows.

FIG. 14 is a diagrammatic configuration drawing which describes the manufacturing process for a conventional optical fiber grating.

In the drawing, reference symbol 11 represents an optical fiber, and this optical fiber 11 is composed of the central part thereof, core 11a, and a cladding 11b which is provided on the outer circumference of this core 11a.

This optical fiber 11 is, for example, an optical fiber which act as a single mode at a wavelength of 1.55 μm (the "single-mode optical fiber").

The core 11a is made of silica glass added germanium as a dopant. Germanium is normally added as germanium dioxide to the silica glass.

In this example, the core 11a is made of silica glass containing 5 wt % germanium dioxide, and the cladding 11b is composed of silica glass the purity of which is effectively at about a level in which the dopant can be ignored (hereinafter, referred to as "the pure silica glass").

Hereinafter, pure silica glass or silica glass added with a dopant, may at times be referred to as the "the silica based glass".

The reference symbol 12 is a phase mask, and this phase mask 12 is made of silica glass. A plurality of gratings 12a is formed at specified intervals on the one side.

The grating part 13 may be formed in the following manner: namely, an ultraviolet laser beam of wavelength 240 nm from an ultraviolet laser generator (not shown) is irradiated on the side surface of the optical fiber 11 via the phase mask 12.

As ultraviolet ray laser generator, KrF excimer laser and the like is used.

Whereupon, an interference fringe is generated from plus first-order diffracted light and minus first- order by the gratings 12a of the phase mask 12 from the irradiation of the ultraviolet ray laser beam. Then, the index of refraction for the part of the core 11a in which this interference fringe has been generated changes, and as a result, the relative refractive index-difference between the core 11a and the cladding 11b changes.

In this manner, a periodic change in the index of refraction for the core 11a is formed along the longitudinal direction of the optical fiber 11. Then, a grating part 13 which is formed with a periodic change for the relative refractive-index difference between the core 11a and the cladding 11b is obtained.

Here, what determines the characteristic as to the optical fiber grating being either a radiating type or a reflecting type is the grating period, representing the period of the change in the index of refraction of the core 11a (the period of the relative refractive index-difference between the core 11a and the cladding 11b).

Now, assume that the propagation constant of the mode, which propagates in the optical fiber is $\beta_1$, and the propagation constant of the mode to be coupled, is $\beta_2$. Then the difference in the propagation constants between these coupling modes, $\Delta\beta$, is represented by the following equation (1):

$$\Delta\beta = \beta_1 - \beta_2 \qquad \text{Equation (1).}$$

Now, grating period $\Lambda$ is given by the following equation (2), where:

$$\Lambda = 2\pi/\Delta\beta \qquad \text{Equation (2).}$$

Here, the propagation constants $\beta_1$ and $\beta_2$ for light are taken as being positive in the direction of the incidence of light and negative in the direction opposite to that of the direction of incidence.

The approximate values taken by $\beta_1$ and $\beta_2$ are roughly equal to $2\pi$ divided by the wavelength of light propagating in the optical fiber. The orders of magnitude of the values are roughly equal to the wavelength of light in a vacuum divided by the index of refraction of the optical fiber.

For example, the orders of magnitude of the various values as a guide are set as follows:
Wavelength of light (in vacuum): 1.55 μm.
Index of refraction of optical fiber: approximately 1.5
Wavelength of light in optical fiber (wavelength in the guide): approximately 1 μm. β1 and β2: approximately 2 π rad/μm.

When the grating period Λ is short, the optical fiber acts as a reflecting type, and when the grating period is long, the optical fiber grating acts as a radiating type.

For this reason, there are cases in which the reflecting-type optical fiber grating will be called the "short-period optical fiber grating", and the radiating-type optical fiber grating will be called the "long-period optical fiber grating".

For example, when the grating period Λ is 0.5 μm, the optical fiber grating used is the reflecting type. That is, a certain mode of light incident from one end of this optical fiber grating (optical fiber 11) couples with the other mode, which proceeds in the core 11a in a direction opposite to that of the incident light (the negative direction) and turns into a reflected light.

This reflected light suffers a loss in the outgoing light, so that it may be used as a device for imparting a loss in a specified wavelength band.

The value of the grating period Λ of 0.5 μm, at this time, corresponds to approximately one half of the wavelength of light in the optical fiber (wavelength in the guide) which has been indicated as the aforementioned guide. By imparting disturbances of such a short period in the longitudinal direction of the optical fiber 11, an indication is made that the light is made to be reflected in the opposite direction.

In contrast to this, the radiating-type optical fiber grating is one for which the grating period Λ of Equation (2) is long. When the optical fiber grating is of the radiating type, the grating period Λ is usually from several tens to several hundreds of μm.

The fact that the grating period Λ is long, indicates that the difference in the propagation constants between modes, Δβ which is involved in the coupling is small, and that couplings between two modes which propagate in the same direction can be generated.

The mode, which has a light incident onto this optical fiber grating coupling with the cladding mode, is radiated as a radiating light to the outside of the core and is attenuated. The light of the mode thus radiated suffers a loss in an outgoing light, so that this optical fiber grating may be used as a device for imparting a loss in the specified wavelength band.

An example of this reflecting-type optical fiber grating has been disclosed in Japanese Patent Application, First Publication No. Hei 7-283786.

In this Publication, disclosure has been made for a radiating-type optical fiber grating, whereby a laser beam is irradiated with a KrF laser through an amplitude mask onto an optical fiber having a core made of silica glass doped with germanium, and the optical fiber grating is formed in which the change in the index of refraction of the grating with a period in a range of 50 to 1500 μm has been formed in the core of the optical fiber.

However, the following problems existed in the conventional art optical fiber grating.

Namely, the combinations of the wavelengths of the light source and the dopant which is added to the optical fiber are restricted. Accordingly, the kinds of light source are restricted as well.

Realistically speaking, in the manufacture of optical fiber gratings, in order to take advantage of the photorefractive effect, the optical fibers are restricted to those to which germanium has been added to the core, and the wavelengths which are capable of generating photorefractive effect in the silica glass doped with germanium has been added are restricted to the wavelengths in the neighborhood of 240 nm.

As laser generators capable of irradiating ultraviolet laser beam of such wavelengths, KrF excimer laser, the second harmonic of the argon laser with a band at 480 nm and the like are included. However, each of these is expensive and is a factor contributing to the increase in the manufacturing cost.

In addition, the change in the index of refraction for the silica glass doped with germanium, obtained by once irradiating ultraviolet ray laser beam from KrF excimer laser and the like, is of the order of $10^{-4}$ to $10^{-3}$ and is not so large. For this reason, in order to obtain a relatively large change in the index of refraction, it is necessary that a given spot be irradiated a large number of times with an ultraviolet ray laser beam; thus the manufacturing process becomes long.

Moreover, since the change in the index of refraction of the optical fiber due to the photorefractive effect is based on the structural defects of silica glass, the stability is not sufficient.

Specifically, the change in the index of refraction caused to be generated in the silica glass doped with germanium, exhibits a conspicuous change within several hours, under the condition of high temperature environment of 200° C. or higher. Also it has been known that a substantial reduction of the change in the index of refraction takes place at temperatures exceeding 300° C.

SUMMARY OF THE INVENTION

It is an object of the present invention to provide an optical fiber grating which has high manufacturing efficiency, without requiring expensive equipment, and to provide a manufacturing method.

It is another object of the present invention to provide an optical fiber grating which exhibits stable grating characteristics over time and to provide a manufacturing method therefor.

In order to achieve these objects, in the present invention, a preform which has softening temperature of its core is heated to a temperature higher than the softening temperature of the cladding. The optical fiber provided with a core, having residual stress which has been obtained by drawing, is intermittently heated, the cladding in the periphery of this core is softened, and the index of refraction of the core is changed from releasing the residual stress, so as to obtain the optical fiber grating by forming a periodic change in the relative refractive index-difference of the core and the cladding in the longitudinal direction of the optical fiber.

For the present invention, the following effects are obtained.

Namely, since the heating means for forming the grating part is not restricted to the wavelength of the laser beam concerned, instead of expensive equipment such as excimer lasers, relatively inexpensive carbon dioxide gas lasers and the like may be used.

Furthermore, since the laser power required for softening the cladding is relatively small, the stress of the core is released so that the index of refraction can be increased, even though the number of scans traversing the optical fiber may be small.

Consequently, the cost of the manufacturing equipment is low, the manufacturing time is short, the operation is simple, and manufacturing efficiency is superior. For these reasons, reduction in cost can be obtained.

Since the periodic changes for the index of refraction of the core (spatially periodic changes for the relative refractive index-difference between the core and the cladding) of this optical fiber grating is of structural nature, there is little change with respect to the passage of time, an optical fiber grating which is stable over a long period of time is obtained.

The optical fiber grating of the present invention is capable of flattening the wavelength dependence of optical devices, for example such as light source, photodetector, light amplifier, optical fiber and the like which have wavelength dependence in the gain-wavelength characteristic, so that it can be used in various optical communication systems.

BRIEF DESCRIPTION OF THE DRAWINGS

The present invention will be described in detail with reference to the accompanying drawings in which:

FIG. 6: FIG. 6A is a diagrammatic construction drawing showing the construction of the forming equipment for the grating part, and FIG. 6B is an illustrative diagram showing the scanning operation of the laser beam;

DESCRIPTION OF THE PREFERRED EMBODIMENTS

Figure 1:
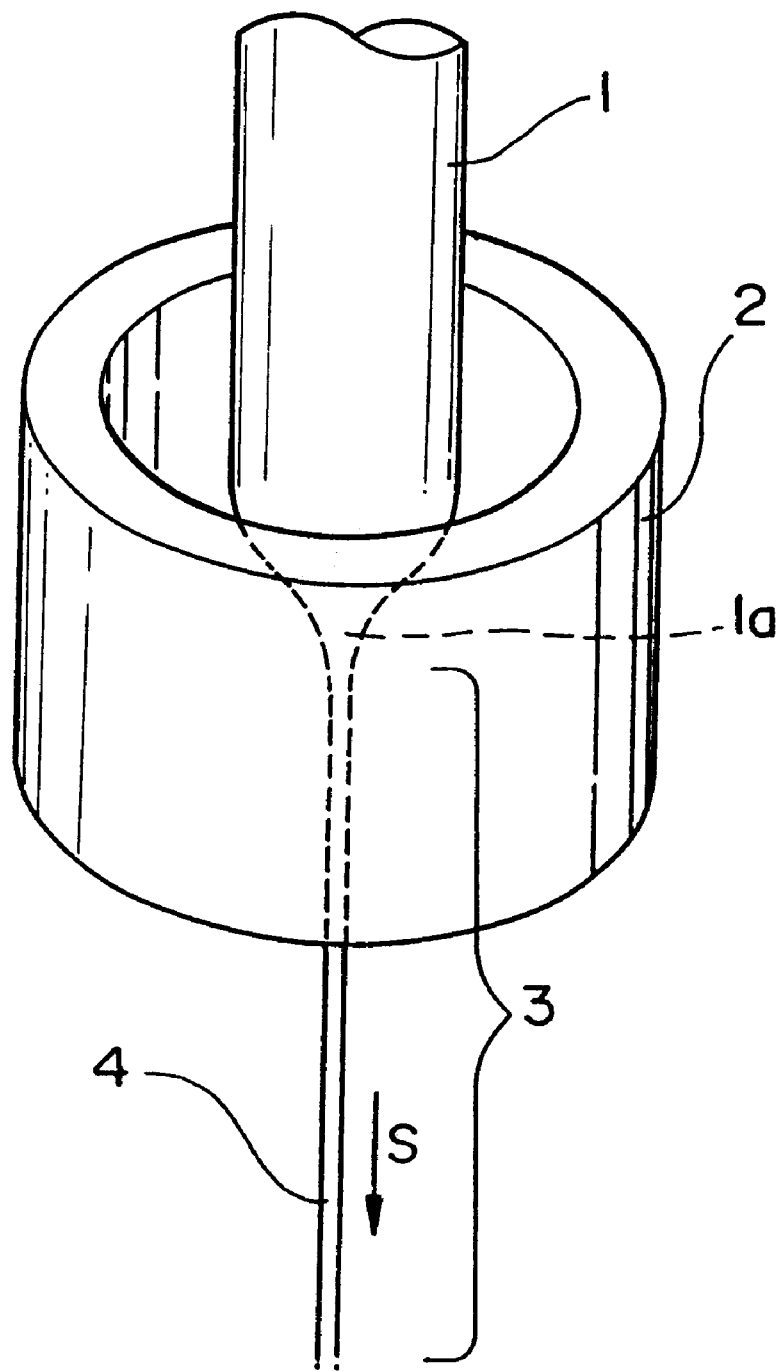
FIG. 1 is a perspective view showing the drawing process for the present invention.

The optical fiber grating of the present invention will be described in detail, following its manufacturing processes, as follows.

The processes for the optical fiber grating of the present invention consists of the process for the drawing of optical fiber for obtaining the optical fiber provided with a core having residual stress, and a forming process for forming the grating part which forms the grating part on this optical fiber.

(1) Process of Optical Fiber Drawing

First, the optical fiber used in the optical fiber grating of the present invention is produced.

This optical fiber has stress remaining selectively, mainly in the interior of the core, and moreover has such a characteristic that by heating, this stress is relaxed and released.

Such an optical fiber can be manufactured, for example through heating a preform (base material for the fiber) and drawing to produce an optical fiber, by taking advantage of the difference in temperatures between the softening temperature of the core and the softening temperature of the cladding, and by having the core in a melted state solidify before of the cladding and having the tensile stress from the drawing remain selectively behind in the interior of the core.

Concrete descriptions are given as follows.

First, a preform is prepared.

This preform consists of a cylindrical core at its center and a cladding which is provided at the outer circumference.

Then the index of refraction of the material constituting the core is higher than that of the material constituting the cladding. And also the softing temperature of the material constituting the core is higher than that of the material constituting the cladding.

In addition, the ratio of the core diameter to the cladding outer diameter of this preform is preferably so set, as to obtain the optical fiber after the drawing to be a single-mode optical fiber. In other words, the optical fiber used in the optical fiber grating for the present invention is desirably a single-mode optical fiber.

In actuality, the optical fiber grating of the present invention can be formed even if the optical fiber is a multi-mode optical fiber.

However, the single-mode optical fiber has a sufficiently large cross-sectional area of the cladding, with respect to the cross-sectional area of the core, so that it is suitable for having the stress remain selectively behind in the core, as is later described.

The conditions related to the indices of refraction are those conditions for having the optical fiber operate with the core serving as a waveguide.

Conditions related to the softening temperatures are those conditions at the time of heating the preform and drawing, for making it into an optical fiber, for solidifying the core in a melted state, before the cladding.

Details will be described later; however, what becomes the guide for the solidification of this core and cladding is the glass transition point. The relation for the glass transition points in the core and cladding follows the relation of the aforementioned softening temperature, if the cooling state (measurement conditions) is constant. That is, since the softening temperature of the cladding is lower than the softening temperature of the core, in the drawing process, the glass transition point of the cladding has been set so as to be lower than the glass transition point of the core.

Also this condition on softening temperature is a necessary condition in the forming process of the grating part, which is also described later.

Now, it has been known that by adding dopants, generally the softening temperature of silica glass is decreased shapely.

Consequently, in order to obtain a temperature difference (the temperature difference of glass transition points) required for the softening temperature, it is necessary that the added amount of the dopant for the core be zero or small, and that the added amount of the dopant for the cladding be relatively large.

As was previously mentioned, it is necessary that the index of refraction of the core be designed higher than the index of refraction of the cladding.

For this reason, the dopant added to the core for this purpose is generally germanium or the like. Germanium possesses an action of raising the index of refraction of the silica glass.

It is essential that the dopant added to the cladding have such a characteristic that it lowers the index of refraction of the silica glass. Such a dopant is limited to either fluorine or boron.

In the present invention, as was mentioned above, addition of a dopant with respect to the core is not indispensable. Even if it is added, for example in the case of germanium, the amount is small at less than or equal to 1 wt %. Rather, from the relation with the transition point of the cladding, it is common to form the core from silica glass to which dopant has not been added.

The amount added as a dopant for the cladding is, for example in the case of fluorine, at a level in the range of 1 to 3 mol % (0.3 to 1 wt %).

In actuality, adjustments are appropriately made for the conditions for manufacturing, including the material compositions for the core and cladding of these preforms, the temperature of the drawing process, the tension of the drawing (the speed of drawing) and the like, so as to obtain the required temperature difference for the transition points of the glass (the softening temperatures), and to obtain the desired relative refractive index-difference between the core and the cladding by the stress left selectivity in the core.

In this example, the core for example, is formed from such pure silica glass that for all practical purposes, impurities can be ignored, and a preform is used which is formed from silica glass added fluorine (hereinafter, this may at times be referred to as "the silica glass doped with fluorine") to which 1 mol % of fluorine has been added to the cladding as the dopant.

As mentioned above, the silica glass doped with fluorine has an index of refraction which is lower than that of pure silica glass, and moreover its softening temperature becomes lower than that of pure silica glass.

For example, in the silica glass doped with fluorine to which fluorine has been added so as to reduce its index of refraction by approximately 0.3%, in comparison to that of pure silica glass, the softening temperature is decreased by roughly 100° C.

Then, as stated above, since the relation of the glass transition point follows the relation for the softening temperature, the glass transition point of the silica glass doped with fluorine becomes lower than the transition point of pure silica glass.

In this example, the relative refractive index-difference between the core and the cladding of the preform is about 0.35%.

Also the softening temperature of the core is about 1600° C. and the softening temperature of the cladding is about 1400° C.

The core diameter of the preform is 3.5 mm, and the outer diameter of the cladding (the outer diameter of the preform) is 50 mm, so as to enable a single-mode optical fiber to be obtained from this preform. That is, with respect to the core diameter, the outer diameter of the cladding is about 14 times as large and is thus sufficiently large.

FIG. 1 is a diagrammatic drawing showing the drawing process of the optical fiber, and the reference symbol 1 represents a preform and 2 is a heating furnace heating unit.

This preform 1 is inserted through a heating element of heating furnace 2 from the upper direction and is drawn with a drawing tension S of 100 g or so, while for example, being heated at 1950° C. Thereupon, the preform 1 is reduced in diameter in the downward direction, and a conical neck down part 1a is formed. Then an optical fiber part 3 which is drawn is formed following this and becomes an optical fiber 4.

Figure 2:
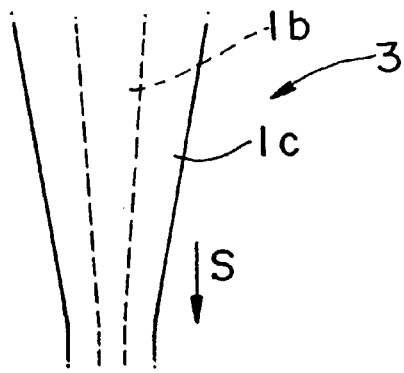
FIG. 2 is an illustrative diagram showing an enlarged view of the optical fiber part in the inside of the heating element of a heating furnace, shown in FIG. 1.

FIG. 2 is a diagram showing an enlarged view of the optical fiber part 3, at the inside of the heating element of heating furnace 2 of FIG. 1.

Since the temperature is sufficiently high in the inside of the heating element of heating surface 2, both the core 1b and cladding 1c have fused at a sufficiently low viscosity. Then the diameters of both of these core 1b and cladding 1c are gradually narrowed by the drawing tension S in the downward direction.

Figure 3:
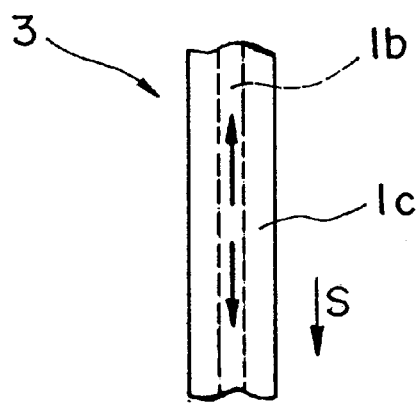
FIG. 3 is an illustrative diagram showing an enlarged view of the optical fiber on the outside of the heating element of a heating furnace, shown in FIG. 1.

Next, as shown in FIG. 3, the diameter of the optical fiber part 3 which has been drawn out of the outside of the heating furnace heating unit 2, is further narrowed, and Its temperature is abruptly decreased.

At this time, since the glass transition point of the core 1b is higher than the glass transition point of the cladding 1c, the core 1b solidifies ahead of the cladding 1c, whereby its viscosity increases. As a result of this, the core 1b reaches such a viscosity that it behaves as an elastic body rather than a so-called viscous body.

The borderline temperature of the point at which a glass behaves either as a fused state or a solid (elastic body) is the glass transition point (Tg) and is considered to be the temperature at which the viscosity of ordinary glass becomes $10^{13.5}$ poises.

Figure 5:
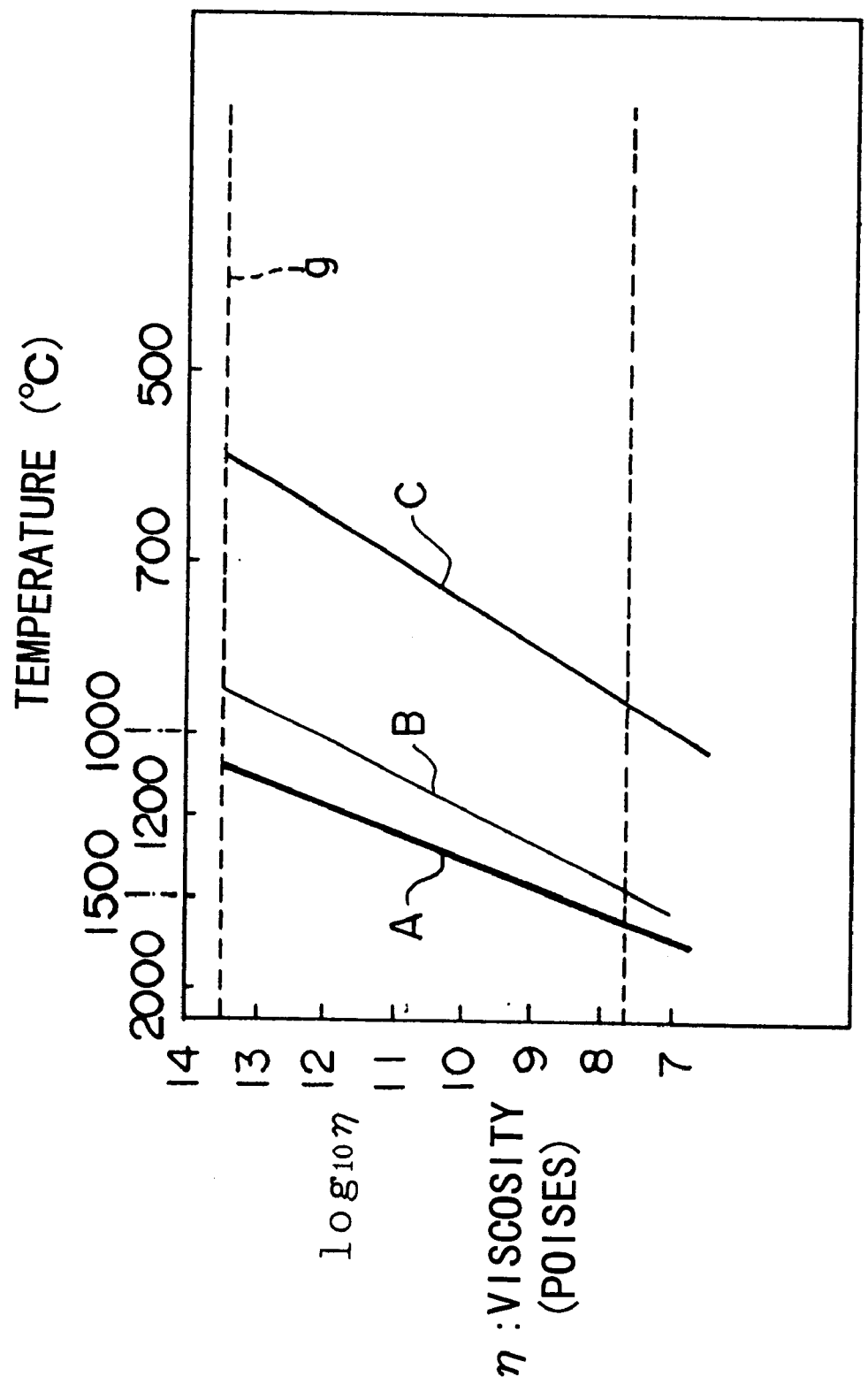
FIG. 5 is a graph showing the relation between the temperature and viscosity for pure silica glass, silica glass doped with 3 wt % fluorine and germanium dioxide.

FIG. 5 is a graph showing the relation between the temperature and the viscosity.

A broken line g shows the viscosity level of $10^{13.5}$ poises, which serves as a reference for the glass transition point. Straight lines A, B and C respectively show the characteristics of a pure silica glass, a silica doped with 3 wt % fluorine, and germanium dioxide.

As can be seen from this graph, in comparison to that of pure silica glass, the glass transition point of the silica glass doped with fluorine is lower. Furthermore, germanium dioxide which is a typical dopant has a glass transition point substantially lower than that of pure silica glass. Consequently, it can be seen that an addition of a dopant can cause the glass transition point to be reduced.

Hereinafter, the transition point of the core 1b is designated as Tg core, and the glass transition point of the cladding 1c is designated as Tg clad.

That is, when the temperature of the optical fiber part 3 is lower than that of Tg core and higher than Tg clad, the core 1b solidifies and behaves as an elastic body. On the one hand, the cladding 1c is still in a fused state in which the viscosity is lower than that of the core 1b.

In short, as shown in FIG. 3, while on the one hand the clad 1c is elongated In the fused state, the drawing tension S applied on the core 1b draws the core 1b as an elastic body. For this reason, the core 1b is elongated elastically and is in a state being applied with a drawing stress (elastic strain), indicated by an arrow inside the core 1b.

In this way, the optical fiber part 3 proceeds in the downward direction for some time until the cladding 1c solidifies, still being applied by the core 1b for which the drawing tension S behaves as an elastic body.

Further, as the optical fiber part 3 proceeds downward, its temperature becomes lower than Tg clad. Thereupon, the cladding 1c solidifies, while the core 1b is still being applied by the drawing tension, and the optical fiber 4 which has been adjusted to a specified diameter is obtained.

In other words, the drawing tension applied to the core 1b turns into a state in which it has been held by the solidification of the cladding 1c.

Then this drawing tension, because of the cross-sectional area of the cladding 1c being overwhelmingly larger in comparison to the cross-sectional area of the core 1b, selectively remains in the core 1b, while being hardly affected by the cladding 1c.

Figure 4:
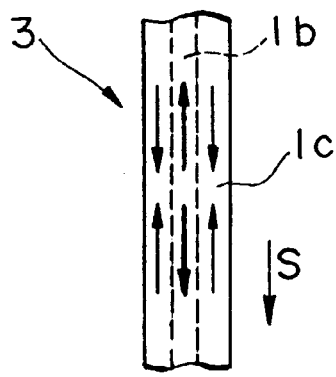
FIG. 4 is an illustrative diagram for the tensile stress inside the core of the optical fiber part and the compressive stress inside the cladding.

Strictly speaking, as shown in FIG. 4, the cladding 1c indeed receives a compressive stress indicated by an arrow inside of the cladding 1c as a reaction to the tensile stress indicated by an arrow in the core 1b. However, since the cross-sectional area of the cladding 1c is sufficiently large in comparison to the cross-sectional area of the core 1b, the value of the compressive stress is small and its effects are at a negligible level.

In this manner, by having it drawn in a state in which the viscosity of the core 1b is higher than the viscosity of the cladding 1c, the optical fiber 4 provided with a core 1b which possesses residual stress (tensile stress) can be obtained.

An example of the characteristics for the optical fiber 4 obtained with this example is shown in Table 1.

TABLE 1

| Fiber diameter | 125 μm |
|---|---|
| Core diameter | Approx. 10 μm |
| Relative refractive-index difference between core and cladding | Approx. 0.25% |
| Core composition | Pure silica glass |
| Cladding composition | Silica glass doped with fluorine |
| Mode field diameter | Approx. 11 μm |
| Cut-off wavelength | 1.15 μm |

As shown in Table 1, the relative refractive index-difference between the core 1b and the cladding 1c decreases to a value which is lower than that of the preform 1, due to the effects of the residual stress.

In this example, in contrast to the relative refractive index-difference for the preform 1 of 0.35%, the relative refractive index-difference for the optical fiber 4 obtained from this is 0.25%.

(2) Process for Forming the Grating Part

An optical fiber grating is produced by forming a grating part on the optical fiber 4 obtained as described above.

FIG. 6A is a diagrammatic construction drawing showing a heating device 6 which forms the grating part.

This heating device 6 is composed of a laser generator 6a, a movable mirror 6b, a lens 6c and a laser beam scanning device 6d.

That is, a laser beam 7 which is generated from the laser beam generator 6a is controlled in its direction by the movable mirror 6b such as a reflecting mirror, a lens and the like, and is further converged to a laser beam diameter in a range of several tens to several hundreds of μm at lens 6c, so as to be scanned by the laser beam scanning device 6d.

The optical fiber 4 is fixed by a fiber clamp, not shown, and is arranged together with this fiber clamp on a fine tuning table which is pulse motor driven. Then it is so arranged that it can be moved along its longitudinal direction by this fine tuning table.

Specifically, first the optical fiber 4 is fixed to the fiber clamp (not shown), and the optical fiber 4 together with the fiber clamp to which it has been fixed therewith is arranged on the fine tuning table (not shown) by pulse motor drive.

Next, as shown by a broken-line arrow in FIG. 6B, by the laser scanning device 6d, the laser beam 7 is scanned from the exterior side surface of the optical fiber 4, so as to be scanned traversing the optical fiber 4 in a direction perpendicular to the longitudinal direction of this optical fiber 4.

At this time, the optical fiber 4 is heated to a temperature at least equal to or higher than the softening temperature of the cladding 1c. Specifically, it is preferable to heat the optical fiber beyond the glass transition point (Tg clad) of the cladding 1c, so as to obtain sufficient softness. However, the temperature is to be such that the core 1b does not soften excessively.

Under normal conditions, this heating temperature is set in the range of 1100 to 1700° C.

This heating temperature may be adjusted by changing the scan speed of the laser beam 7. In the actual manufacturing, preliminary experiments are preferably conducted at various scan speeds, so as to find, in advance, a suitable scan speed which is capable of softening the cladding 1c.

Although ordinarily the number of scans (the number of traversals over the optical fiber 4) is set to be in the range of one to ten times, it is preferable to adjust the scan speed so that the cladding 1c can be softened with one to two scans.

The stress which has been detained by the cladding 1c and has stayed behind in the core 1b is released, mainly due to the softening of the cladding 1c from this heating and the disappearance of the detaining force. As a result, a stress released part 1d is formed.

In this way, by heating the optical fiber 4, the core 1b for which the softening temperature is higher than that of the cladding 1c, has its residual stress released in a state in which its form is sufficiently maintained.

Thereupon, the index of refraction of the core 1b is increased in this released part 1d.

Then when the scanning of the laser beam 7 has been completed, the temperature of the optical fiber 4 decreases and the cladding 1c of the stress released part 1d re-solidifies.

Both the core 1b and the cladding 1c are made of silica glass, and the values of the coefficients of thermal expansion of these are at comparable levels. Consequently, when the temperature of the optical fiber 4 decreases and the cladding 1c solidifies, unless a stress which is external to the optical fiber 4 is added, both the core 1b and the cladding 1c are in states in which there is hardly any strain due to stress.

Next, as shown in FIG. 6A, by moving the fine tuning table, the optical fiber 4 can be moved by a distance corresponding to a specified single period of the grating in its longitudinal direction, and the laser beam 7 is made to scan, as shown again in FIG. 6B, to form the second stress released part 1d.

By periodically repeating the aforementioned operation with a specified period, a plurality of stress released parts 1d are formed intermittently at specified grating periods.

In the stress released parts 1d provided at specified intervals in the core 1b, the index of refraction of the core 1b is changing periodically. As a result of this, a grating part 5 is so constituted which caused the generation of fluctuation in the relative refractive-index difference between the periodic core 1b and the cladding 1c, in the longitudinal direction of the optical fiber 4.

Since the grating period of this optical fiber grating forms the stress released parts 1d by local heating, normally it is set in the range of 200 to 2000 μm. Consequently, the optical fiber grating of the present invention is one which may be suitably applied to the radiating type.

Further, in the present invention, the grating period may have its period precisely constant or approximately constant. When the period is approximately constant, the variation in this period is to be of ±15% level.

In addition, in this example, the laser beam 7 was scanned by having the irradiating position of the laser beam 7 move, so as to traverse the optical fiber 4 in the laser scanning device 6d. In addition to this, the laser beam 7 may also be scanned by fixing the irradiating position of the laser beam 7 and have the optical fiber 4 move in a direction orthogonal with respect to its longitudinal direction by the fine tuning table.

Further, in this example, after having formed a single stress released part 1d, in the formation of the adjacent stress released part 1d, although the optical fiber 4 has been moved together with the fine tuning table in its longitudinal direction, the irradiating position of the laser beam 7 may be moved in the longitudinal direction of the optical fiber 4.

In other words, by changing the angle of the movable mirror 6b, it is also possible to scan the laser beam 7 or to move the irradiating position of the laser beam 7, in the longitudinal direction of the optical fiber 4.

Manufacturing Examples

Specific manufacturing examples in this formation process for the grating are described as follows.

For the optical fiber 4, one having the characteristics shown in Table 1 was used.

For the laser generator 6a, a carbon dioxide gas laser was used.

The output of the laser generator 6a (carbon dioxide gas laser) was approximately 3W at the maximum.

The stress released parts 1d were formed by controlling the direction of this laser beam 7 via the movable mirror 6b, converging the beam diameter to approximately 200 μm level by the lens 6c, furthermore scanning five times In a direction orthogonal with respect to the longitudinal direction of the optical fiber 4 by the laser beam scanning device 6d.

At this time, the heating temperature of the optical fiber 4 was adjusted by having the scan speed of the laser beam scanning device 6d changed experimentally in advance, making the laser beam 7 to be scanned in a manner similar to the present embodiment and observing the softening state of the cladding 1c of the optical fiber 4, and finding the scan speed condition which is capable of sufficiently softening the cladding 1c.

Moreover, the length of the one stress release part 1d along the longitudinal direction of the optical fiber 4 has been set to approximately 200 μm, similar to the beam diameter which converged in the lens 6c of the laser beam 7.

Next, the irradiating position of the laser beam 7 was moved by only the length, corresponding to one period portion of the grating period in the direction of the optical fiber 4 (approximately 400 μm), and the next stress released part 1d which is adjacent to the stress release part 1d.

In the present embodiment, the forming operation of this stress release part 1d was periodically repeated with the grating period of approximately 400 μm, along the longitudinal direction of the optical fiber 4.

Then the grating part 5 was formed within a range of 10 mm in the longitudinal direction of the optical fiber 4.

The length of this grating part 5 (10 mm) is referred to as a grating length.

The index of refraction of the core 1b is increased locally, in the stress released parts 1d. As a result of this, the relative refractive index-difference between the core 1b and the cladding 1c became approximately 0.35% level.

Figure 7:
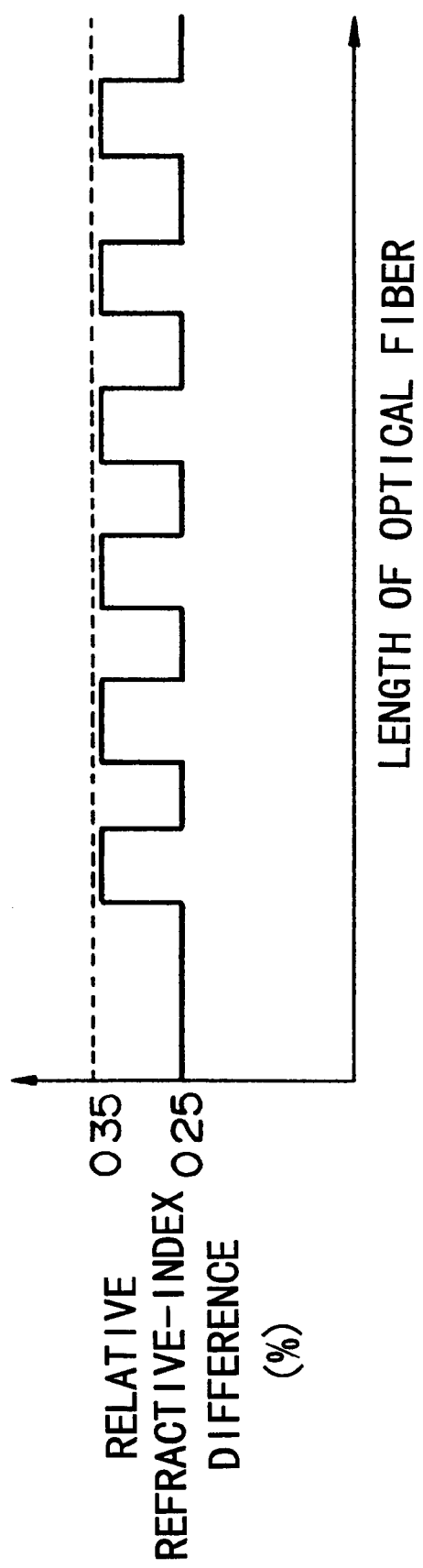
FIG. 7 is a graph schematically showing the change in the relative refractive-index difference, in the longitudinal direction of the grating part of the optical fiber grating obtained by an embodiment for manufacturing of the present invention.

FIG. 7 is a graph schematically showing the change in the relative refractive-index difference of this grating part 5 in the longitudinal direction of the optical fiber 4.

As shown in this graph, the grating part 5 could be formed for which the relative refractive index-difference mutually changes periodically from 0.25% to 0.35%, by having the index of refraction of the core 1b change periodically.

Figure 8:
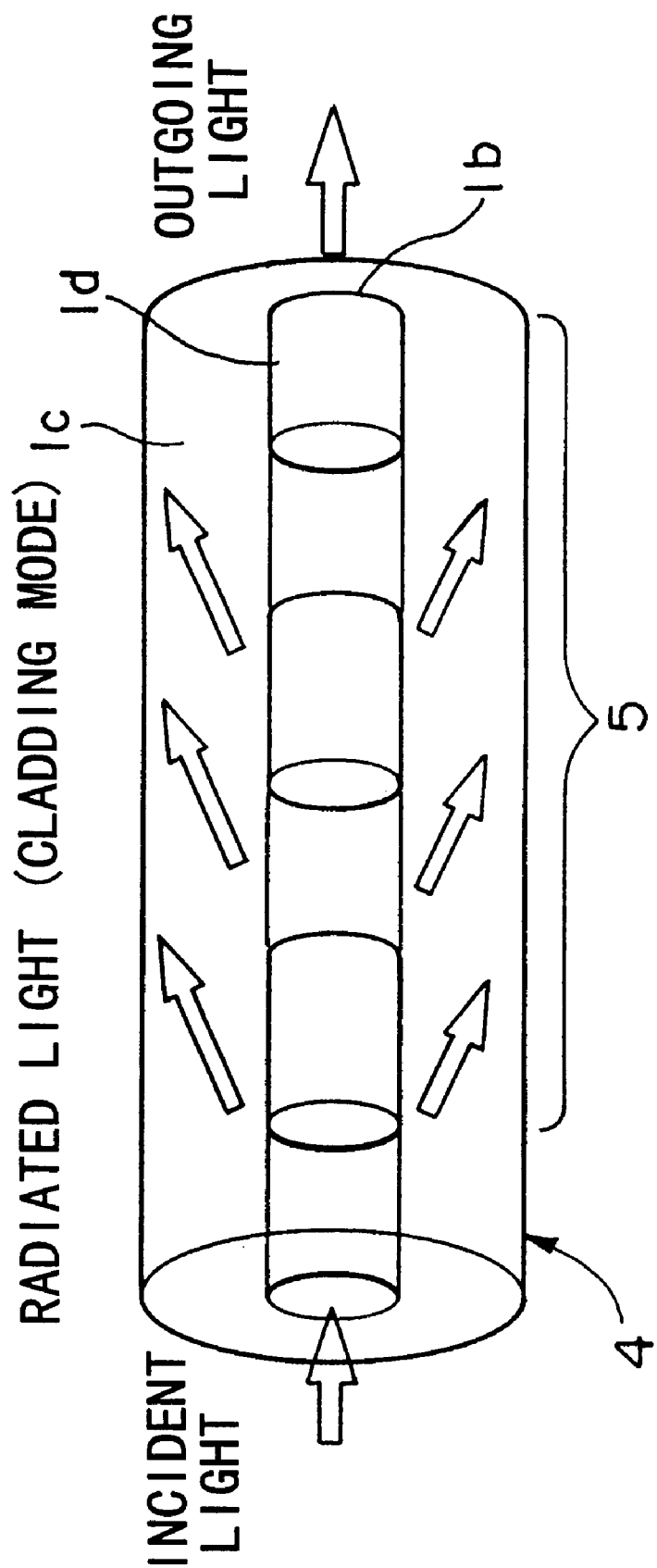
FIG. 8 is an illustrative diagram schematically showing the operation of the optical fiber grating obtained by an embodiment for manufacturing of the present invention.

FIG. 8 is an illustrative diagram schematically showing the operation of this optical fiber grating.

The grating period of this optical fiber grating is approximately 400 μm, and since its period is long, it operates as a radiating-type optical fiber grating.

Namely, a specified mode of the incident light couples with the radiated light (cladding mode) which propagates through the cladding 1c, in the grating part 5 and is quickly attenuated. As a result of this, an outgoing light, which has lost the light of the wavelength band coupled to the cladding mode, is obtained.

Figure 9:
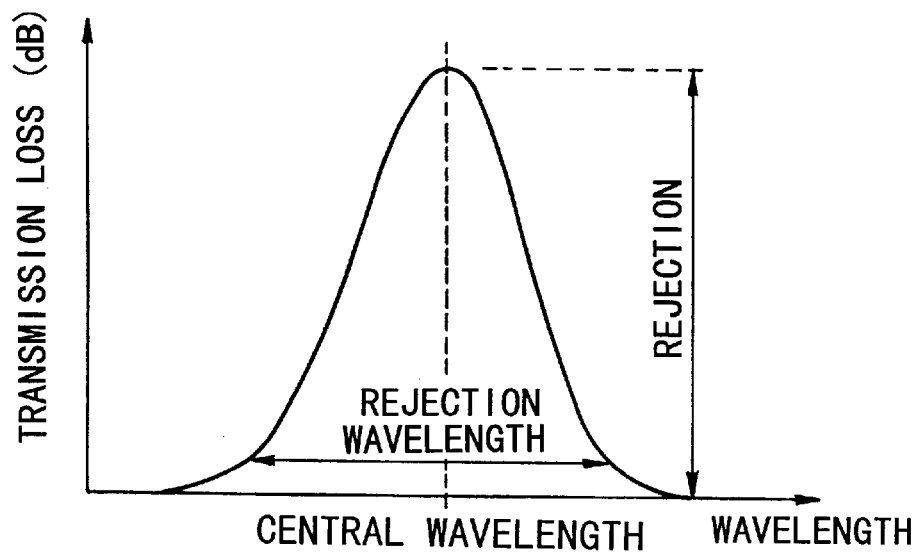
FIG. 9 is a graph showing the wavelength-transmission loss characteristic of the optical fiber grating obtained by an embodiment for manufacturing of the present invention.

FIG. 9 is a graph showing the wavelength-transmission loss characteristic of this optical fiber grating.

As this graph shows, transmission loss of light in the specified wavelength band has become selectively large.

The width of a wavelength region in which the transmission loss increases is called a "rejection bandwidth", its wavelength at the center, "the central wavelength", and the size of the change for the transmission loss the, "rejection", respectively.

In the present embodiment, a central wavelength of 1555 nm, a rejection bandwidth of approximately 14 nm, and a rejection peak value of approximately 3 dB could be obtained.

In the present embodiment, a carbon dioxide gas laser was used as the laser generator 6a.

For the laser generator 6a, it is sufficient if it is capable of heating at least the optical fiber 4 to higher than or equal to the softening temperature of the cladding 1c, and while there is no particular restriction, a small-sized carbon dioxide laser may be suitably used.

Included in the other means of heating (laser generator 6a) which can be used means which can locally heat, such as YAG laser, those utilizing arc discharge and the like.

Arc discharge is a means used in fusion splicing connector of the optical fibers, and this may be diverted. Included as specific conditions for the case using an arc discharge are, for example, a distance between the discharge electrodes of 2 mm, frequency of the high frequency to be applied of 140 kHz, the voltage between the discharge electrodes at the time of initiating the discharge of approximately 10,000 volts, and approximately 100,000 volt level during the discharge.

Heating means which utilize the carbon dioxide gas laser, YAG laser and arc discharge are relatively inexpensive if they are of low output, and it is also an advantage of the present invention that an inexpensive heating means such as this can be used.

In particular, a laser beam having a standard oscillating wavelength of 10.6 µm for the carbon dioxide gas laser has a very high absorptivity for the silica based glass, and with the irradiation of the laser beam, this silica based glass becomes an opaque body. Consequently, carbon dioxide laser is suited to local heating of the optical fiber 4.

In addition, since the temperature at which ordinary cladding 1c sufficiently softens is, for example, at a level in the range of 1350° C. to 1700° C., when a carbon dioxide gas laser is used, the power required is extremely small.

For example, when the laser beam exiting from this carbon dioxide gas laser is directly irradiated on an optical fiber composed of a standard silica based glass of diameter 125 µm, the laser power required for heating this optical fiber for a length which spans a level of 200 µm, from room temperature to 1500° C., is less than or equal to several hundred mW level.

However, similarly to the heating device 6 shown in FIG. 6A, the laser power decreases to some extent by traveling through the movable mirror 6b and the lens 6c.

Further, by scanning the laser beam 7, effective irradiation time per unit surface area of the optical fiber 4 becomes short.

For this reason, if the laser power is set to a level in the range of several W to 10W for the carbon dioxide gas laser used, the optical fiber 4 may be heated and the stress released parts 1d may be formed which have a comparable leeway.

Moreover, although it is expensive, it is also possible to use an excimer laser such as KrF excimer laser which are used in the manufacture of optical fiber grating, utilizing the conventional photoreactive effect.

In the prior art manufacturing method of the optical fiber grating, its core uses an optical fiber made of silica glass doped with germanium and by irradiating this with an ultraviolet laser beam in the neighborhood of the wavelength of 240 nm from KrF excimer laser and the like, the index of refraction of the core is increased.

However, when used as the laser generator 6a of the present invention, the KrF excimer laser is used as one not for increasing the index of refraction of the core 1b, but merely as a heating means.

That is, in this example, either germanium has not been added or even if it has been added as a dopant to the core 1b, the amount is small. So that even if an ultraviolet laser beam is irradiated by the excimer laser, there is no occasion for the occurrence of increase in the index of refraction of the core 1b.

In this way, since the laser beam 7 has no wavelength dependence, it is also possible to use excimer lasers other than the KrF excimer laser.

In this way, in the manufacture of the aforementioned optical fiber grating, the laser generator 6a used as the heating means is not limited in the wavelength of its lasers. For this reason, relatively inexpensive carbon gas lasers and the like may be used, without employing expensive equipment such as excimer lasers.

Further, since the laser power required for softening the cladding 1c is comparatively small, by adjusting the scan speed of the laser beam, it is sufficient to have the laser beam 7 scan relatively few number of times traversing across the optical fiber 4, in order to form a single stress released part 1d.

Therefore, low cost equipment, short manufacturing time, simple operation, and superior manufacturing efficiency are obtained. As a result, cost reduction can be obtained.

In addition, since the change in the index of refraction of the core 1b is structural in the stress released parts 1d, changes over time are small, so that a stable optical fiber grating may be obtained.

The optical fiber grating of the present invention may be used to flatten the wavelength dependence which optical devices have, such as light source, photodetector, light amplifier, optical fiber and the like.

When the gain-wavelength characteristic of light which passed through these optical devices has a wavelength dependence, the wavelength dependence can be made small by having a light of wavelength with a particularly large gain lose light with the use of the optical fiber grating, thereby flattening it.

For example, flattening of such gain-wavelength characteristic is effective when making wavelength division multiplexing transmission, in an optical fiber communication system having a light amplifier.

Such an optical communication system has a basic construction consisting of a light source, an optical fiber transmission path connected thereto, a light amplifier inserted Into this optical fiber transmission path and a photodetector which detects the outgoing light from the optical fiber transmission path.

Then, in order to make the wavelength characteristic (wavelength dependence), which the optical devices (light source, photodetector, light amplifier and optical fiber) constituting the optical communication system composed of this basic construction, have the desired wavelength characteristic, an optical fiber grating is used, while being inserted into an optical fiber transmission path.

Figure 10:
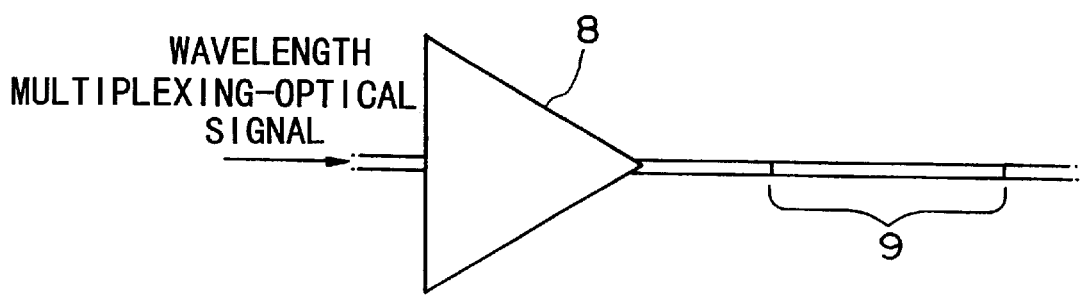
FIG. 10 is a diagrammatic construction drawing showing an example of the optical fiber communication system, using a light amplifier which utilizes the optical fiber grating of the present invention.

FIG. 10 is a diagrammatic construction drawing showing an example of the optical communication system which utilizes the optical fiber grating of the present invention. In the figure, the reference symbol 8 is a light amplifier, and reference symbol 9 is the optical fiber grating of the present invention. These are connected to a light source (not shown) at their incidence sides and is inserted into an optical fiber transmission path to the outgoing sides of which are connected a light detector (not shown), thereby constructing this optical fiber communication system.

Figure 11:
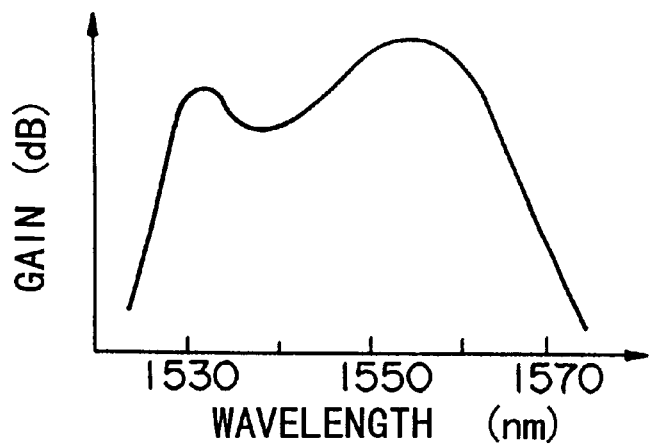
FIG. 11 is a graph showing the gain-wavelength characteristic of the erbium doped optical fiber amplifier.

At present, an erbium doped optical fiber amplifier is often used for the light amplifier 8. FIG. 11 is a graph showing an example of the gain-wavelength characteristic for the erbium doped optical fiber amplifier.

Figure 12:
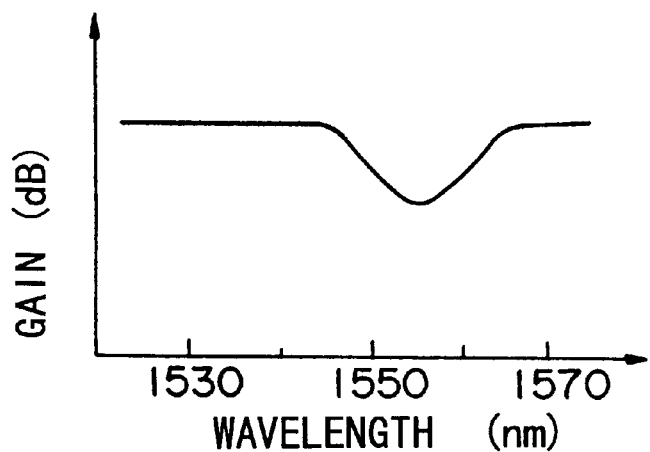
FIG. 12 is a graph showing the gain-wavelength characteristic of the optical fiber grating.

FIG. 12 is a graph showing an example of the gain-wavelength characteristic for an optical fiber grating 9.

Figure 13:
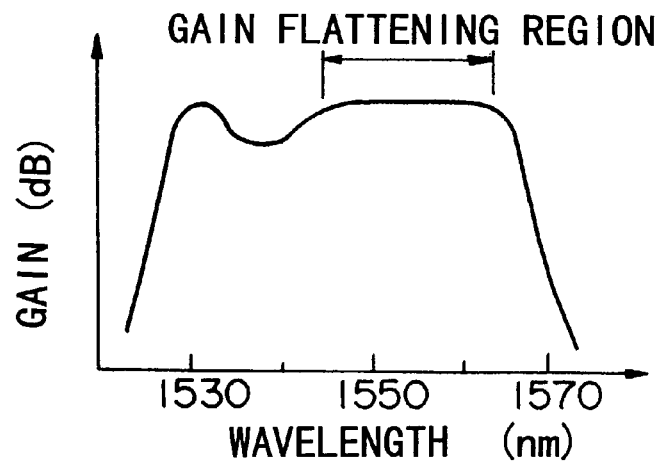
FIG. 13 is a graph showing the gain-wavelength characteristic of an optical communication system obtained, when a light amplifier and the optical fiber grating is combined.
Figure 14:
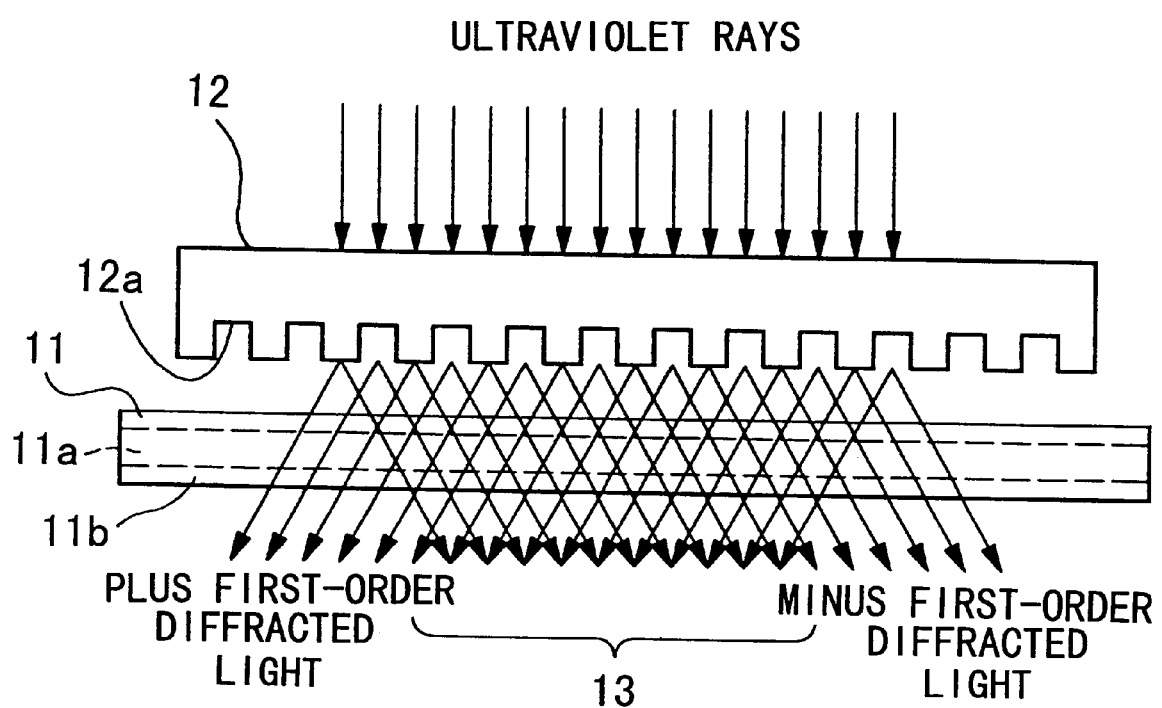
FIG. 14 is a diagrammatic construction drawing describing the manufacturing process of the prior art optical fiber grating.

FIG. 13 is a graph showing an example of the gain-wavelength characteristic which is obtainable when these light amplifier 8 and optical fiber grating 9 are combined.

From FIG. 11, it can be seen that gain peaks exist in the neighborhoods of the wavelengths 1535 nm and 1558 nm and that they are wavelength dependent.

When wavelength division multiplexing transmission is conducted which transmits light of a plurality of wavelengths at the same time, using such a light amplifier 8, for example, a light of wavelength in the range of 10 waves to several tens of waves, of the range of 1 to 2 nm intervals is transmitted in parallel simultaneously. For this reason, normally the wavelength region which is transmitted simultaneously exceeds 10 nm, and it is necessary to have a flat amplification wavelength characteristic in this wavelength region.

Here, as shown in FIG. 12, by combining with the optical fiber grating 9 having effective loss in the neighborhood of the wavelength 1558 nm, the gain may be flattened, as shown in FIG. 13. As a result of this, it is possible to construct an optical communication system comprising of a light amplifier with an extremely high degree of wavelength flattening.

When a gain-wavelength characteristic relation was measured with an optical fiber grating obtained by the manufacturing embodiment which was inserted into such an optical communication system, it was confirmed that a wavelength flat region such as the one indicated in FIG. 13 can be obtained.

The optical fiber grating of the present invention is not limited to the light amplifier illustrated as an example here but can be used in various optical communication systems, for the purpose of flattening the wavelength dependence for such optical devices as light source, photodetector, light amplifier, optical fiber and the like have.

What is claimed is:

1. A manufacturing method for an optical fiber grating comprising the steps of:

heating intermittently, with a specified spatial period in the longitudinal direction, an optical fiber provided with a core having residual stress;

softening a cladding in the neighborhood of the core; and forming periodic changes for the relative refractive-index difference between said core and said cladding, in the longitudinal direction of said optical fiber, by releasing said residual stress to change the index of refraction of the core, to form the optical fiber grating.

2. The manufacturing method for an optical fiber grating according to claim 1, wherein a preform is heated so that the softening temperature of the core is higher than the softening temperature of the cladding, and said optical fiber is manufactured by drawing.

3. The manufacturing method for an optical fiber grating according to claim 1, wherein said core is composed of pure silica glass, and said cladding is composed of silica glass doped with fluorine.

4. The manufacturing method for an optical fiber grating according to claim 1, wherein said optical fiber is a single-mode optical fiber.

5. The manufacturing method for an optical fiber grating according to claim 1, wherein a carbon dioxide laser is used as a heating means for heating the optical fiber.

6. The manufacturing method for an optical fiber grating according to claim 1, wherein said optical fiber grating has a period of periodic change in said relative refractive index-difference in the range of 200 to 2000 $\mu$m.

7. An optical fiber communication system comprising an optical fiber grating manufactured according to the manufacturing method recited in claim 1.

8. An optical fiber communication system according to claim 7, wherein said optical fiber communication system comprises a light source; an optical fiber transmission path connected thereto; a light amplifier; the optical fiber grating; and a photodetector for detecting an outgoing light from said optical fiber communication path, wherein the light amplifier and the optical fiber grating are inserted into the optical fiber transmission path.

* * * * *